United States Patent [19]

Depperman

[11] Patent Number: 5,285,947
[45] Date of Patent: Feb. 15, 1994

[54] WELDING FIXTURE

[75] Inventor: Warren B. Depperman, Lugoff, S.C.

[73] Assignee: Cogsdill Tool Products, Inc., Camden, S.C.

[21] Appl. No.: 944,876

[22] Filed: Sep. 14, 1992

[51] Int. Cl.⁵ .............................................. B23K 37/04
[52] U.S. Cl. ..................... 228/49.3; 269/48.1
[58] Field of Search .................. 228/49.3, 44.5; 269/48.1

[56] References Cited

U.S. PATENT DOCUMENTS

| | | | |
|---|---|---|---|
| 2,780,194 | 2/1957 | Croswell | 228/49.3 |
| 3,979,041 | 9/1976 | Kaneyama et al. | 228/49.3 |
| 4,582,241 | 4/1986 | Johnson | 228/49.3 |
| 4,890,473 | 1/1990 | Westerman et al. | 228/49.3 |

Primary Examiner—Kenneth J. Ramsey
Attorney, Agent, or Firm—Harness, Dickey & Pierce

[57] ABSTRACT

A welding fixture is disclosed for temporarily retaining two tubular workpieces relative to one another. The welding fixture includes a plurality of shoe assemblies, each of the shoe assemblies being radially movable between a contracted position and an expanded position. The welding fixture further includes an actuator operatively connected to each of the shoe assemblies for selectively moving each shoe assembly between the contracted position and the expanded position. Upon expansion of the shoe assemblies, the welding fixture is operative to reinforce and temporarily retain a joint formed between two tubular workpieces during a joining procedure, such as welding.

15 Claims, 4 Drawing Sheets

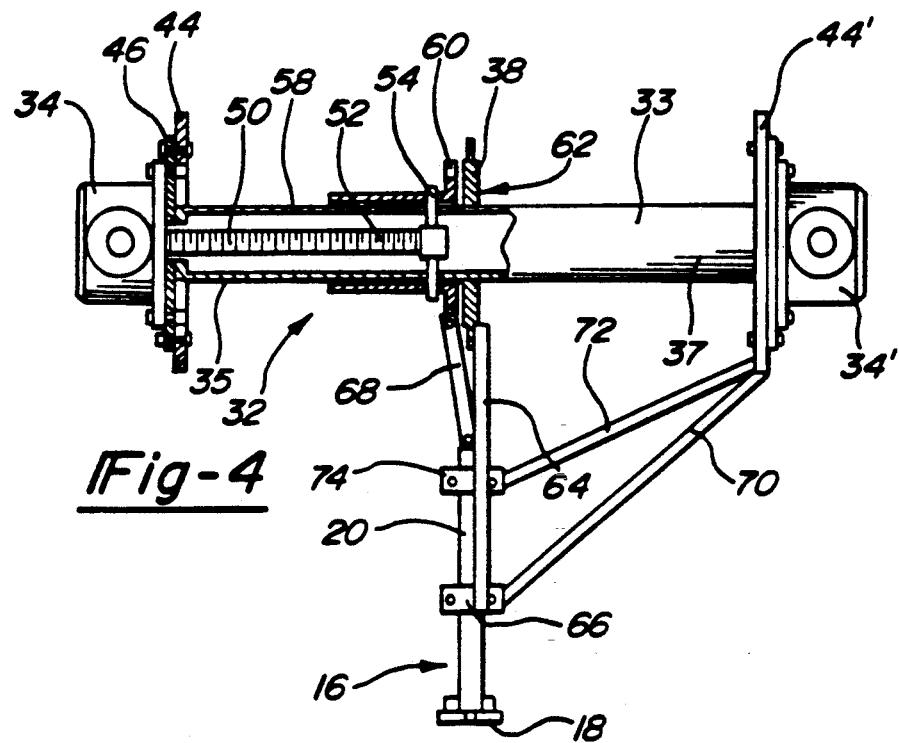
_Fig-4_
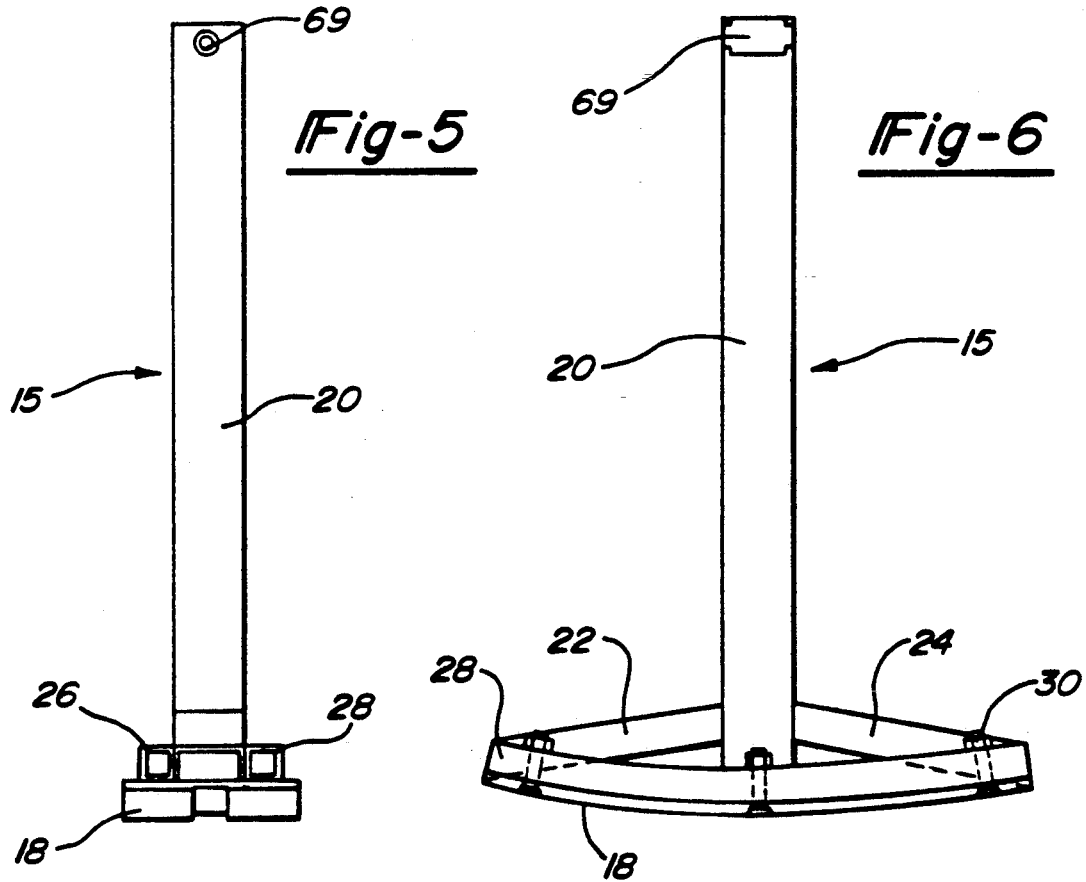
_Fig-5_  _Fig-6_

WELDING FIXTURE

BACKGROUND OF THE INVENTION

1. Technical Field

The present invention in general relates to a welding fixture. More particularly, the present invention relates to a fixture for supporting a joint between two tubular workpieces, and retaining the two workpieces relative to one another while the workpieces are being joined by a process such as welding.

2. Discussion

Welding fixtures are often employed during a joining operation of two workpieces, such as welding. The welding fixture serves to temporarily retain the workpieces relative to one another. Preferably, the welding fixture also functions to support the joint formed between the two workpieces during the joining process. Various tools have been devised over the years in an attempt to permit one workpiece to be temporarily aligned and supported with a mating workpiece while the two workpieces are fixedly secured together by a joining procedure. Such devices have proven to be commercially acceptable for a wide range of applications, either alone or in cooperation with additional clamping devices.

While prior devices have satisfactorily operated in most applications, disadvantages are inherent in these same devices under particular circumstances. In this regard, a need remains for a welding fixture adapted to temporarily retain a first tubular workpiece relative to a second tubular workpiece while the first and second workpieces are permanently joined. Previously developed tools are generally unsuited for supporting the joint between the two workpieces as the workpieces are rotated and exteriorly welded. For example, in such an application, prior welding fixtures required contact with the exterior of the workpieces, thereby interfering with the welding. Furthermore, many previously developed welding fixtures are weight prohibitive in that they are unsuitable due to the damage they would cause where the workpieces are constructed from light weight metals, such as aluminum, or very thin metal. Other previously developed welding fixtures are also unsuited to substantially continuously support the joint formed between two tubular workpiece sections by only engaging the interior perimeters of the sections.

It is therefore a principal object of the present invention to provide a welding fixture which is capable of temporarily securing two tubular workpieces relative to one another from the interior of the workpieces, without the aid of any other clamping mechanism or support device.

It is a further object of the present invention to provide a welding fixture sufficiently light so as to not damage thin wall tubing.

It is still a further object of the present invention to provide a welding fixture which substantially provides continuous support about the perimeter of a joint formed between two axially aligned tubular workpieces.

Yet still another object of the present invention is to provide a welding fixture adapted to conform the perimeter of a generally tubular workpiece to a uniform radius of curvature.

SUMMARY OF THE INVENTION

The above and other objects are accomplished by providing a welding fixture constructed in accordance with the teachings of the present invention. The welding fixture is adapted for temporarily retaining two tubular workpieces relative to one another, and generally comprises a group of shoe assemblies which includes two independently operated pluralities of shoe assemblies. Each shoe assembly of the group of shoe assemblies is axially arranged about an axis, and is radially movable between a contracted position and an extended position. The welding fixture further comprises a drive mechanism operatively connected to each of the shoe assemblies. The drive mechanism is selectively operable for moving each shoe assembly between its contracted position and extended position.

BRIEF DESCRIPTION OF THE DRAWINGS

Various advantages of the present invention will become apparent to one skilled in the art by reading the following specification and subjoined claims and by referencing the following drawings in which:

FIG. 4 is a partial side sectional view of the drive assembly of the present invention shown operatively connected with a shoe assembly of the present invention;

FIG. 5 is a side elevational view of the shoe assembly of the present invention; and FIG. 6 is a front elevational view of the shoe assembly of FIG. 5.

DETAILED DESCRIPTION OF THE PREFERRED EMBODIMENTS

Throughout the drawings, the teachings of the present invention are shown incorporated into a particular embodiment. It will be appreciated that the teachings of the present invention are applicable to a wide range of uses and the illustrated embodiment is merely exemplary. More specifically, the embodiment illustrated is particularly applicable in aiding in the welding of two tubular sections. For example, such a welding operation is desirable in the fabrication of liquid transporting tanker trailers.

Figure 1:
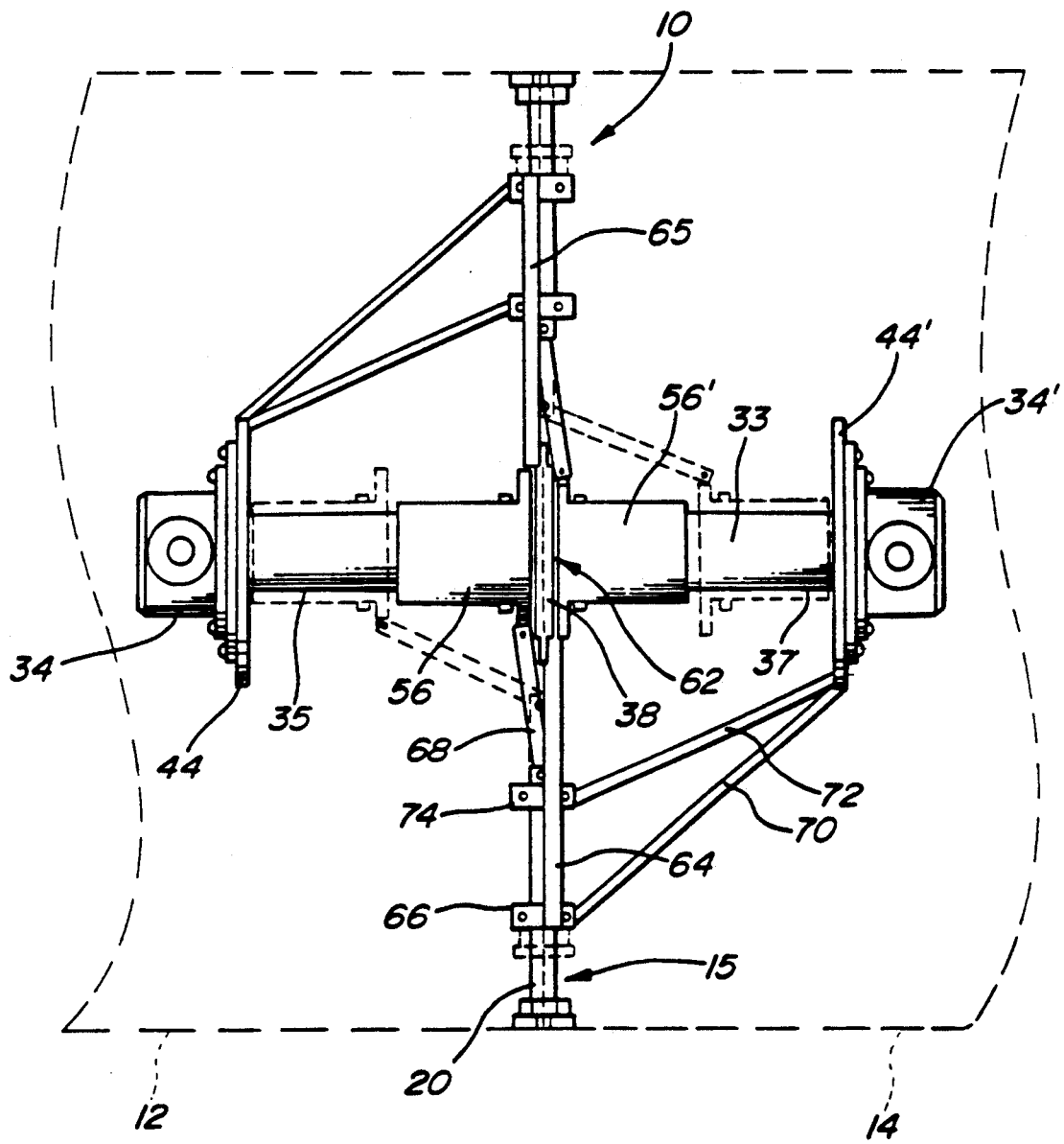
FIG. 1 is a side elevational view of the welding fixture of the present invention constructed in accordance with the teachings of the present invention, shown in operative cooperation with two tubular workpieces (shown in phantom)

Turning to FIG. 1, the welding fixture 10 of the present invention is shown operatively associated with two generally tubular workpieces 12,14 (shown in phantom). The workpieces 12,14 are substantially cylindrical and each have an inside diameter of approximately 75.00 inches. The dimensioning of the exemplary embodiment of the welding fixture 10 is such that it is adapted to accommodate the same. Accordingly, it will be appreciated by those skilled in the art, that the dimensions herein included are susceptible to modification.

As will become apparent below, the welding fixture 10 of the present invention is substantially symmetrical about the midpoint of its longitudinal axis. Given this symmetry, description of the welding fixture 10 of the present invention can be had with reference being mostly limited to one side of the fixture 10. In this regard, most of the focus of this description will detail the left hand side of the front view. Reference made to similar elements located on the opposite side will be made with identical reference numerals differentiated with a prime.

Figure 2:
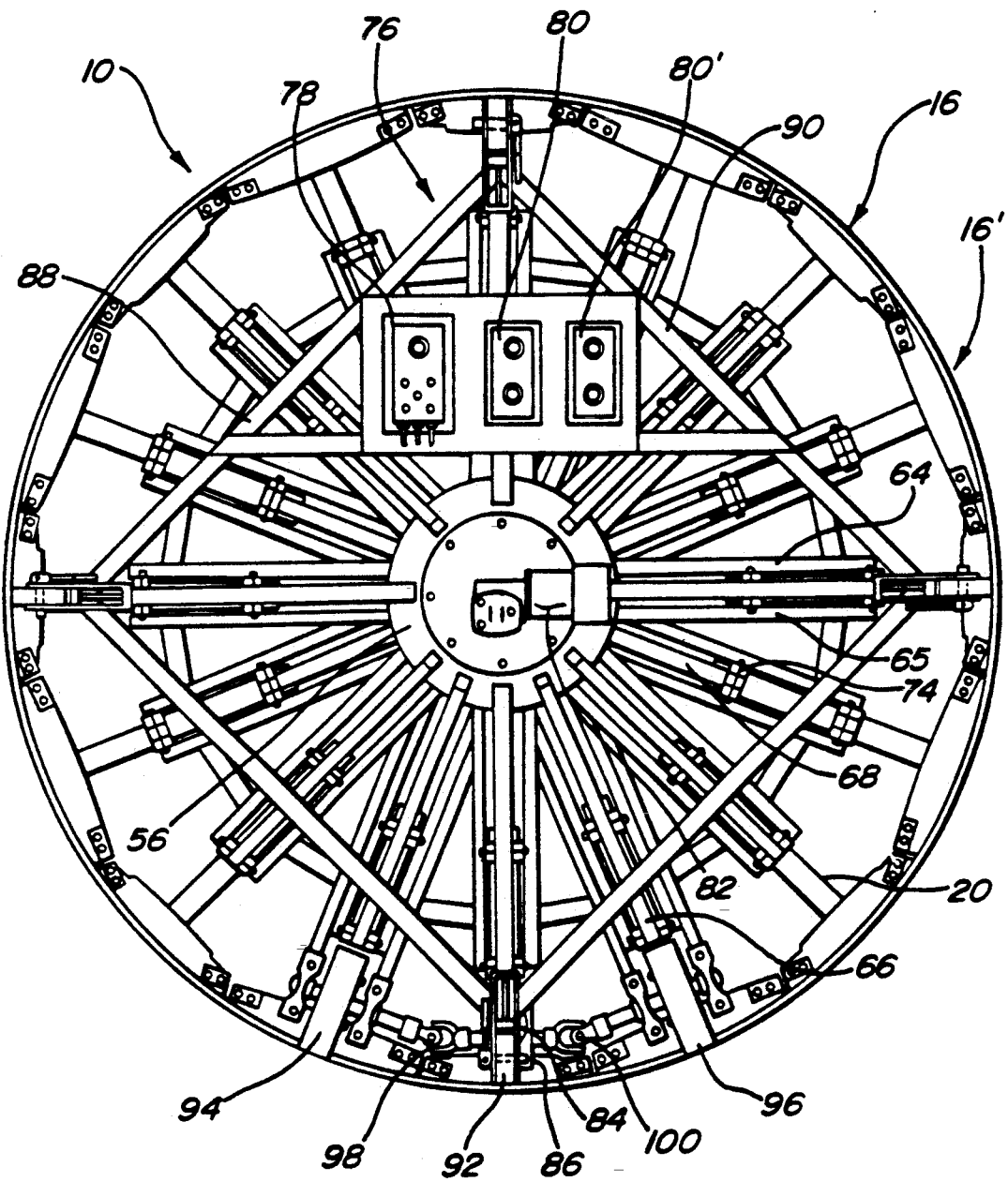
FIG. 2 is a front elevational view of the welding fixture of FIG. 1 showing the fixture in a fully extended, operative position in cooperation with a control assembly.
Figure 3:
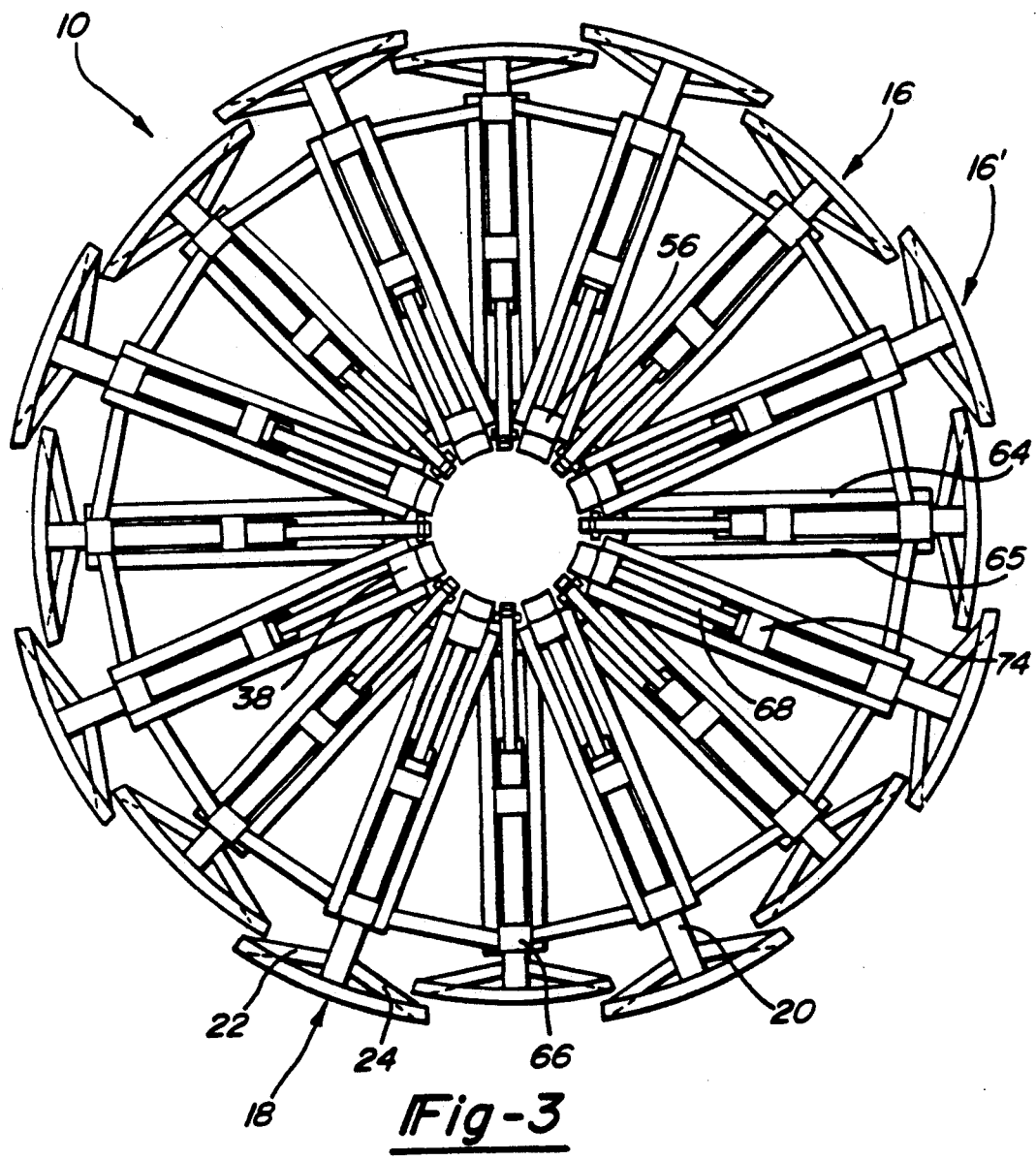
FIG. 3 is a front elevational view of the welding fixture of FIG. 1 in a retracted position.

As shown in FIGS. 2 and 3, in the preferred embodiment, the welding fixture includes a group of shoe assemblies comprising sixteen (16) shoe assemblies 15. The shoe assemblies 15 are operatively arranged into first and second pluralities of shoe assemblies 16,16'. For the sake of simplicity, FIG. 1 illustrates the welding fixture 10 to include only two shoe assemblies 15, one from each plurality of shoe assemblies 16,16'. The welding fixture 10 is particularly suited to be used during the joining of two tubular workpieces 12,14 having a substantially identical inside diameter, which are to be joined substantially coaxially relative to each other. Additionally, the welding fixture 10 is adapted to conform a generally cylindrical workpiece to a uniform radius.

Referring to FIG. 2, the welding fixture 10 constructed in accordance with the teachings of the present invention is shown in a fully extended state. As will be discussed in more detail below, the control assembly 76 of the present invention is also shown in FIG. 2. Referring additionally to FIG. 3, in order to illustrate the operation of the present invention, the welding fixture 10 of the present invention is shown with the shoe assemblies 15 of the first and second pluralities of shoe assemblies 16,16' in a retracted state.

It will be appreciated by those skilled in the art that the number of shoe assemblies 15 is susceptible to change in order to accommodate a particular application. Of significance is the outer distance between two directly opposite facing shoe assemblies 15, and thereby the overall diameter of the fixture 10. This distance must necessarily be substantially equivalent to the inner diameter of the tubular workpieces 12,14 which are to be welded. In the exemplary embodiment illustrated, the overall diameter of the welding apparatus 10, while fully extended, is approximately 75.00 inches.

Referring additionally to FIGS. 4 through 6, each shoe assembly 15 includes a plate portion 18, a radial arm 20, first and second arm supports 22,24 and first and second plate supports 26,28. The shoe assemblies 15 of the welding fixture 10 are numbered and radially dimensioned such that a nominal gap exists between adjacent shoe assemblies 15 upon full expansion of all the shoe assemblies 15, thereby providing substantially continuous support of the joint formed between the two workpieces 12, 14. In the exemplary embodiment, a nominal gap of approximately 0.020 inch exists between adjacent shoe assemblies 15 when the welding fixture 10 is fully expanded, as shown in FIG. 2. This nominal gap affords clearance for the shoe assemblies 15 of the first plurality 16 to be retracted from their extended positions radially adjacent the shoe assemblies 15 of the second plurality 16'.

The plate portion 18 of each shoe assembly 15, in the exemplary embodiment, is constructed of 0.25 inch stainless steel and has a radius of curvature substantially equivalent to that of the tubular workpieces 12,14. Further, the plate portion 18 has an outer perimeter substantially equivalent to 1/16 of the inner perimeter of the workpieces 12,14. The plate portion 18 is attached to the remainder of the shoe assembly 15 by bolts 30. In this regard, the plate portion 18 is directly attached to the first and second plate supports 26,28, which are, in turn, joined to the first and second arm supports 22,24 and the radial arm 20.

In the preferred embodiment, the radial arm 20 is constructed of $2'' \times 2'' \times \frac{1}{8}$ square steel tubing. The first and second arm supports 22,24 are constructed of $1'' \times 2'' \times \frac{1}{8}$ steel tubing. The plate supports 26,28 are constructed of $1'' \times 1'' \times \frac{1}{8}''$ square steel tubing.

As illustrated in FIG. 4, welding fixture 10 of the present invention further comprises means for contracting and extending the shoe assemblies 15. This means for contracting and extending the shoe assemblies 15, in the preferred embodiments, is provided by a drive assembly 32. The drive assembly 32 includes a tubular mast 33 adapted to be disposed axially relative to the radially spaced radial arms 20 of the shoe assemblies 15. In the preferred embodiment, the drive assembly 32 further comprises first and second electromechanical actuators 34,34' and a mounting ring 38.

The first and second electromechanical actuators 34,34' are attached to the fore and aft ends 35,37 of the mast 33 respectively. The first actuator 34 is operative for retracting and extending the shoe assemblies 15 of the first plurality of shoe assemblies 16. Similarly, the second actuator 34' is operative for retracting and extending the shoe assemblies 15 of the second plurality of shoe assemblies 16'. In the preferred embodiment, the electromechanical actuators 34,34' are electrically driven one ton machine screw actuators. A suitable actuator is commercially available from Duff Norton Co.

A brace plate 44, is disposed at each end of the tubular mast 33, to which an actuator mounting plate 46 is affixed, via bolts. The first and second actuators 34,34' are bolted to the respective mounting plate 46.

Each actuator 34,34' includes a screw 50 (as shown in FIG. 4) which extends coaxially into its respective end of the tubular mast 33. The screw 50, at its distal end 52 is adapted to receive a pin 54, which passes through a tubular sleeve 56. Each tubular sleeve 56 is adapted to move along the tubular mast 33. To this end, the tubular mast 33 includes channels 58 through which the pin 54 is allowed to pass. It will be appreciated by those skilled in the art that a bearing (not shown) can be disposed between the sleeve 56 and the mast 33, to thereby facilitate longitudinal movement of the sleeve 56. The tubular sleeve 56 includes a radially extending flange 60.

The mounting ring 38, of the present invention, is fixedly secured to the approximate midpoint of the tubular mast 33. The first plurality of shoe assemblies 16, which comprises 8 (eight) shoe assemblies 15, is attached to a first side 62 of the mounting ring 38. That is, each shoe assembly 15 of the first plurality of shoe assemblies 16 is attached to the mounting ring 38 via first and second main support arms 64, 65. More particularly, the main support arms 64, 65 are attached to each shoe assembly 15, through a first guide assembly 66. The radial arm 20 is adapted to move radially relative to the first roller assembly 66.

Each shoe assembly 15 of the first plurality of shoe assemblies 16 is also pivotally attached to the flange 60 of the tubular sleeve 56 through an actuator link 68. The actuator link 68 is pivotally attached at a first end to the radial arm 20 by a bushing 69, and at a second end to the flange 60 of the sleeve 56.

Further in the preferred embodiment, each shoe assembly 15 of the first plurality of shoe assemblies 16 is interconnected to the mounting plate 44' associated with the second actuator 34'. More particularly, a first brace arm 70 is welded at one end to the brace plate 44', and at its other end to the first roller assembly 66. Similarly, a second brace arm 72 is welded at one end to the brace plate 44', and at it other end to a second guide assembly 74. Each of the first and second guide assemblies 66, 74 may include rollers.

The shoe assemblies 15 of the first plurality of shoe assemblies 16 are spaced apart approximately 45°. The shoe assemblies 15 of the second plurality of shoe assemblies 16' are identical to that of the first plurality of shoe assemblies 16, and are rotated 22.5° relative thereto. Thus, all of the shoe assemblies 15 are equally spaced axially about the axis defined by the tubular mast 33.

As illustrated in FIG. 2, the welding fixture 10 of the present invention further comprises a control assembly 76. The control assembly 76 includes a speed controller 78 and first and second electrical control boxes 80,80' which control electromechanical actuators 34,34' respectively. The control assembly 76 additionally includes a gear motor 84 which is controlled by the speed controller 80, and a right angle speed reducer 86. A suitable gear motor 84 and right angle speed reducer 86 are commercially available from Grainger as parts nos. 4Z129 and 6X165C, respectively.

The control assembly 76 of the present invention is mounted to the remainder of the welding fixture 10 through a bracket assembly 88. The bracket assembly 88 has a substantially rectangular portion 90 and attaches to the remainder of the welding fixture 10 through four intermediate members (not shown). One intermediate member is associated with each of the four corners of the rectangular portion 90 of the bracket assembly 88. The intermediate members are welded at a first end to their respective corner. The intermediate members are disposed to extend substantially perpendicular to the rectangular portion 90 and are welded at their second ends to the remainder of the welding fixture 10 at four of the first guide assemblies 66.

Also located at each corner of the rectangular portion 90 is a wheel 92. The wheels 92 are used to precisely position the welding fixture 10 inside the tube, and each preferably includes a brake (not shown). The wheels 92 contact the tubular workpieces 12,14 about the inner perimeter, thereby facilitating axial movement of the welding fixture 10. In this regard, the grooves in the shoes 18 can be positioned precisely beneath the weld seam. When in position, the brakes are locked to prevent accidental movement. To permit movement from one seam to another, drive wheels 94, 96 are coupled to the gear motor via first and second universal joints 98, 100 respectively. Drive wheels 94, 96 serve to advance the welding fixture within the tubular workpieces 12, 14 when driven by the gear motor 84.

THE OPERATION OF THE FIXTURE ASSEMBLY

Assuming the welding fixture 10 of the present invention to be fully expanded, as shown in FIG. 2, the welding fixture 10 can be contracted by advancing the tubular sleeves 56, 56' towards their respective ends of the tubular mast 33 (as shown in phantom in FIG. 1). In this regard, first the tubular sleeve 56 associated with the first actuator 34 is advanced towards the fore end 35 of the tubular mast 33, thereby retracting the shoe assemblies 15 attached to the tubular sleeve 56 to their maximum inboard position, as shown in FIG. 3. As the tubular sleeve 56 is advanced towards the fore end 35 of the tubular mast 33, the actuator links 68 serve to advance the radial arms 20 radially towards the tubular mast 33.

Similarly, the tubular sleeve 56' associated with the second actuator 34' is next advanced towards the aft end 37 of the tubular mast 33, thereby retracting the shoe assemblies 15 connected thereto and interleaving the ends of the shoe assemblies 15 of the second plurality of shoe assemblies 16' over the shoe assemblies 15 of the first plurality of shoe assemblies 16.

The welding fixture 10 is expanded by reversing this procedure. Full expansion of the welding fixture 10 of the present invention serves to conform the perimeter of a generally tubular workpiece to a uniform radius of curvature.

It is necessary that the shoe assemblies 15 are interleaved upon contraction in order to provide substantially continuous back-up behind the weld seam upon full expansion. In the preferred embodiment a nominal gap of approximately 0.020 inches exists between each adjacent shoe assembly 15 when the welding fixture 10 is expanded. If all the shoe assemblies 15 were retracted simultaneously, this gap would approach zero at an outer diameter of approximately 74.90 inches. This minimal amount of contraction is not sufficient to permit the welding fixture 10 to be easily moved prior to and subsequent to the welding operation.

Thus, the shoe assemblies of the first plurality of shoe assemblies 16 are retracted first. Subsequently, the shoe assemblies of the second plurality of shoe assemblies 16' are retracted partially and interleaved over the shoe assemblies of the first plurality 16. This provides sufficient contraction to enable movement of the welding fixture 10.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An apparatus for use in joining two tubular workpieces, said apparatus comprising:
   a group of shoe assemblies including first and second pluralities of shoe assemblies, each shoe assembly of said group of shoe assemblies including a radial arm axially arranged about an axis, and an actuator link pivotally attached at a first end to said radial arm, each shoe assembly of said group of shoe assemblies further being radially moveable between a contracted position and an extended position; and
   drive means operatively connected to each shoe assembly of said group of shoe assemblies for selectively moving each shoe assembly of said group of shoe assemblies between said contracted position and said extended position, said drive means comprising a shaft member disposed along said axis, at least one actuator, a first sleeve and a second sleeve, said first and second sleeves being axially movable along said shaft member;
   wherein a second end of said actuator links of said first plurality of shoe assemblies is pivotally attached to said first sleeve, and a second end of said actuator links of said second plurality of shoe assemblies is pivotally attached to said second sleeve, wherein said shoe assemblies of said group of shoe assemblies cooperate to provide substantially continuous contact with each of said tubular workpieces about an inner diameter of said tubular workpieces when each said shoe assembly is in said extended position.

2. The apparatus of claim 1, wherein each shoe assembly of said group of shoe assemblies further includes a support arm attached at a first end to a guide assembly and at a second end to said mounting member, said radial arm of said shoe assembly being radially movable with respect to said guide assembly.

3. The apparatus of claim 1, wherein each shoe assembly of said group of shoe assemblies lies substantially in a single radial plane when each said shoe assembly of said group of shoe assemblies is in said extended position.

4. The apparatus of claim 1, wherein each shoe assembly of said group of shoe assemblies further comprises a plate member adapted to engage said tubular workpieces.

5. The apparatus of claim 4, wherein each of said plate members has a radius of curvature substantially equivalent to said inner diameter of said tubular workpieces.

6. The apparatus of claim 1, wherein each shoe assembly of said group of shoe assemblies are equally spaced apart about said axis at a predetermined distance.

7. The apparatus of claim 6, wherein adjacent shoe assemblies of said group of shoe assemblies are interleaved when said shoe assemblies are in said contracted position.

8. The apparatus of claim 1, wherein said drive means comprises first and second actuators, said first and second actuators being operatively associated with said first and second pluralities of shoe assemblies, respectively.

9. An apparatus for aligning and expanding two tubular workpieces prior to welding said two tubular workpieces, said apparatus comprising:
   a group of shoe assemblies including first and second pluralities of shoe assemblies, each shoe assembly of said group of shoe assemblies having a radial arm axially arranged about a longitudinal axis and an engaging portion adapted to engage said tubular workpieces;
   a hollow tubular member disposed along said longitudinal axis, said tubular member having first and second ends;
   first and second electromechanical actuators for independently moving said first and second pluralities of shoe assemblies, respectively, between an extended position and a contracted position; and
   a first substantially cylindrical sleeve axially moveable along said tubular member, said first sleeve having a cylindrical flange extending radially therefrom and being interconnected with said first electromechanical actuator by a screw disposed along said longitudinal axis;
   wherein said first and second electromechanical actuators are located at said first and second ends of said tubular member, respectively.

10. The apparatus of claim 9, wherein each shoe assembly of said first plurality of shoe assemblies further including an actuator link, each actuator link having a first end pivotally attached to one of said radial arms and a second end pivotally attached to said flange of said first sleeve, whereby each shoe assembly of said first plurality of shoe assemblies is simultaneously radially moved through axial translation of said first sleeve.

11. The apparatus of claim 10, wherein each shoe assembly of said first plurality of shoe assemblies further comprises a guide assembly, each said guide assembly adapted for limiting axially translation of said radial arms of said shoe assemblies as said shoe assemblies are moved between said extended and contracted positions.

12. The apparatus of claim 11, further comprising a brace plate attached to said tubular member adjacent said second electromechanical actuator, and wherein each shoe assembly of said first plurality of shoe assemblies further comprises brace means for interconnecting said brace plate and said guide assemblies.

13. The apparatus of claim 12, wherein said brace means comprises first and second brace arms each having a first end pivotally attached to said brace plate and a second end pivotally attached to one of said guide assemblies.

14. The apparatus of claim 13, further comprising a pin interconnecting said screw and said first sleeve, and wherein said tubular member includes an axially extending channel through which said pin is permitted to pass as said first sleeve is axially translated.

15. The apparatus of claim 14, further comprising a plate disposed substantially equidistantly between said first and second ends of said tubular member, said plate being fixed to said tubular member, said guide assemblies of said first plurality of shoe assemblies being fixedly attached to said plate.

* * * * *